Nov. 25, 1952 R. B. SANGER 2,619,613

AMPLIFIER CIRCUIT

Filed May 27, 1950

INVENTOR.
RICHARD B. SANGER
BY Daily & Daily
ATTORNEYS

Patented Nov. 25, 1952 2,619,613

UNITED STATES PATENT OFFICE 2,619,613

AMPLIFIER CIRCUIT

Richard B. Sanger, Glen Rock, N. J., assignor to Allen B. Du Mont Laboratories, Inc., Clifton, N. J., a corporation of Delaware Application May 27, 1950, Serial No. 164,657

3 Claims. (Cl. 315—26)

This invention relates to electronic amplifier circuits and particularly to the deflection circuits used in cathode-ray oscillographs and similar instruments.

When it is desired to monitor television signals, which contain information over a wide band of frequencies extending from D. C. to perhaps 4 or 5 megacycles per second, it is necessary that some means be provided for amplifying either the complete signal, including the D. C. component, or just the alternating components of the signal and restoring the D. C. component in or prior to the last amplifier stage that a complete signal may be presented on the face of a cathode-ray tube. As is well known, it is desirable that the signal be applied to the deflection plates of the cathode-ray tube through an amplifier balanced with respect to a fixed voltage, such as ground, to prevent trapezoidal distortion of the pattern. A centering circuit must be included in the oscillograph to allow the operators to center the pattern or move it about on the face of the cathode-ray tube, and this centering circuit must not introduce any distortion into the amplifier.

Accordingly it is an object of the invention to provide an improved cathode-ray oscillograph amplifier.

Another object is to provide an improved amplifier for a cathode-ray oscillograph used as a television waveform monitor.

A further object is to provide an improved D. C. restoration and centering circuit for use in a cathode-ray oscillograph used as a television waveform monitor.

Further objects and advantages of the invention will be apparent after studying the following description.

The invention is embodied in a cathode-ray tube circuit employing a pair of amplifier tubes for applying signals to the cathode-ray tube deflection means and adjustable direct current restoration circuits between said tubes to permit symmetrical application of said signals to the cathode-ray tube. The invention will be more clearly understood by reference to the following specification and drawings in which.

Figures 1, 2, 3:
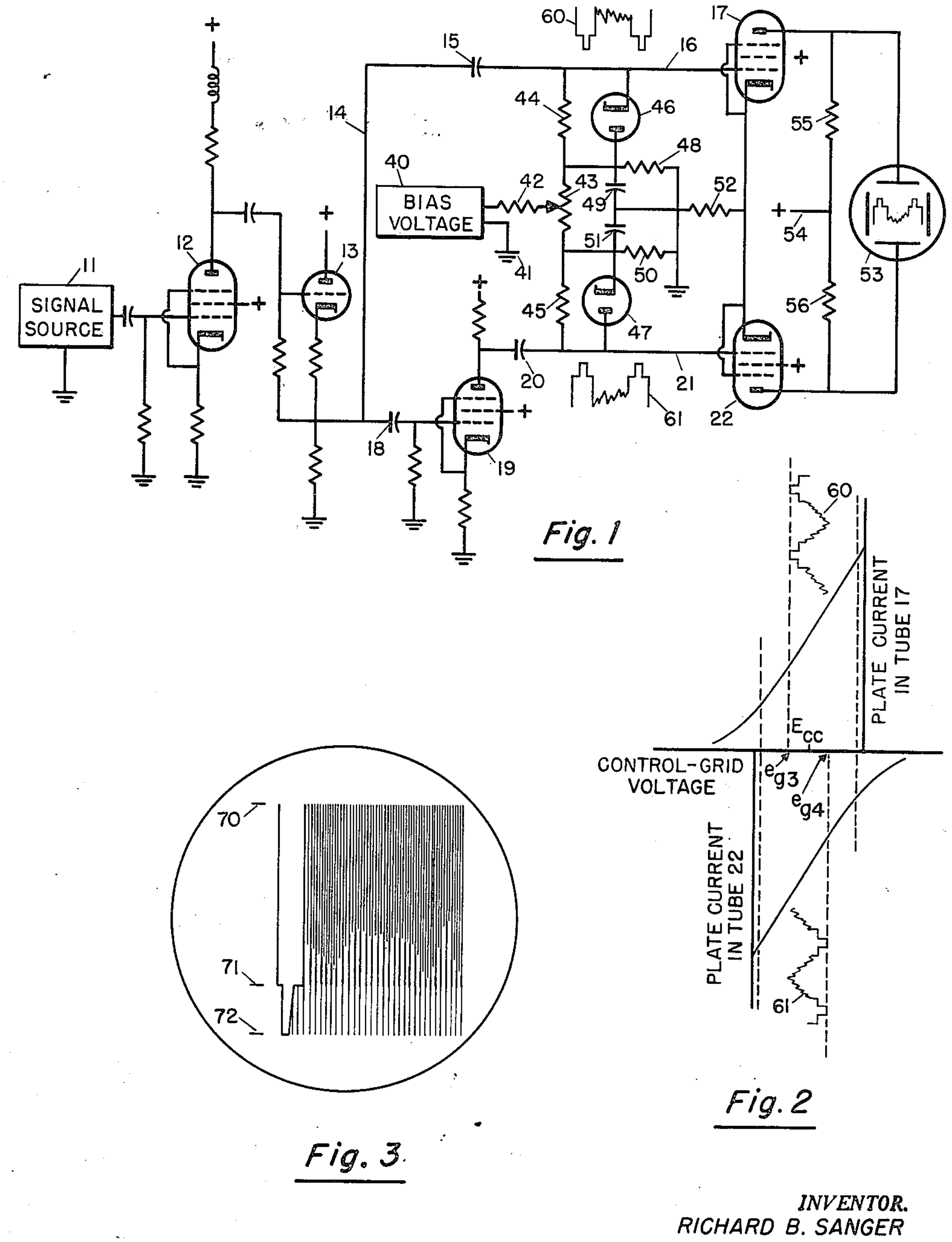
Figure 1 shows a circuit of a cathode-ray oscillograph amplifier embodying the invention.
Figure 2 shows a typical set of control-grid voltage vs. plate current curves for the final amplifier tubes in Figure 1.
Figure 3 shows the pattern on the face of a cathode-ray oscillograph monitoring a television signal.

In Figure 1 a signal source 11, which may be any circuit through which a television or similar signal passes, is connected to the input of an amplifier 12. The output signal of the amplifier 12 is then fed to a second amplifier 13 connected as a cathode follower, which in turn is connected through line 14, condenser 15 and line 16 to output amplifier 17. Also amplifier 13 is connected through a condenser 18 to a polarity inverting amplifier 19. The output signal of the amplifier 19 is connected through condenser 20 and line 21 to the second output amplifier 22.

That portion of the circuit between the source 11 and the condensers 15 and 20 is a detailed exposition of a typical circuit used for bringing a deflection signal to a cathode-ray tube and may be replaced by any circuit capable of feeding signals of opposite polarity and sufficient magnitude to the condensers 15 and 20.

The D. C. restoration circuit for the signal is symmetrical from the condensers 15 and 20 to the cathode-ray tube. Specifically the bias voltage supply 40, with one end grounded at 41, furnishes through resistor 42 a voltage to variable resistor 43. The latter resistor serves as a potentiometer which is connected between lines 16 and 21 through resistors 44 and 45. Also connected between lines 16 and 21 are diodes 46 and 47, the former having its cathode connected to line 16 and the latter having its plate connected to line 21. The plate of diode 46 is connected to one end of potentiometer 43 and is brought to ground through the parallel combination of resistor 48 and condenser 49. The cathode of diode 47 is brought to ground through the parallel combination of resistor 50 and condenser 51. The cathodes of tubes 17 and 21 are connected together and grounded through resistor 52.

For application of the signal developed on each of the amplifier tube plates, which signal in the one case is the inverse of the other, the plates of the tubes are connected to the deflection plates of the cathode ray tube 53, which receive their voltage supply through line 54 which connects thereto through resistors 55 and 56.

The operation of the circuit in Figure 1 is as follows: A television signal from the source 11 is amplified by the amplifiers 12 and 13. Since these amplifiers, and possible others inside the signal source 11, are condenser coupled, the D. C. component of the signal will be lost before it reaches the output of the amplifier 13. To restore this component the television signal from the amplifier 13 is applied to the D. C. restoration circuit comprising the condenser 15, the diode 46, and the resistor 44. The signal at this point should have the polarity shown by the wave form 60 since this D. C. restoration circuit is connected to restore the negative tips of the voltage to a given level. The negative tips of the wave form 60 are the synchronization pulses of the television wave and are generally more uniform than the positive part which carries the video information.

The output signal of the amplifier 13 is also passed through the polarity inverting amplifier 19 in which the plate load is preferably of such a value as to prevent the amplifier 19 from having a gain appreciably greater than unity. The signal from the amplifier 19 has a polarity as shown by the wave form 61, and the D. C. restoration circuit comprising the condenser 20, the resistor 45, and the diode 47 restores the positive peaks of the signal 61 to a given value.

The voltage to which the first named D. C. restoration circuit would restore the negative peaks of the signal 60 is the voltage existing at the plate of the diode 46. This voltage is derived from the bias voltage source by means of voltage divider comprising the resistors 42 and 48 and that part of the potentiometer 43 between the arm and the resistor 48. The voltage to which the positive peaks of the signal 61 would be restored is determined by the voltage on the cathode of the diode 47, which is derived from the voltage across resistor 50 in a manner similar to the voltage across resistor 48.

Figure 2 illustrates the relation between the control grid voltages and the plate currents of the output tubes 17 and 22. These curves are symmetrical about the control grid voltage $E_{cc}$, which is the voltage between the control grids and the cathodes of the tubes 17 and 22 when the potentiometer 43 is set so that the voltage across resistor 48 is equal to the voltage across resistor 50. This center bias, $E_{cc}$, is then equal to the voltage across the cathode resistor 52 plus the voltage across resistor 48 (or resistor 50).

It can be seen that as the arm of the potentiometer 43 is rotated toward resistor 44, the voltage at the plate of the diode 46 would approach the voltage of the bias supply; although it could never reach that voltage because of the drop of potential across resistor 42. If the bias supply of voltage were positive, the plate of the diode 46 would become more positive and correspondingly the cathode of the diode 47 would become less positive. The effect of this rotation would be to displace the signals 60 and 61 to the right on the control-grid voltage axis in Figure 2 without distorting any part of either signal as long as they both remained within the linear portion of the curves of the amplifiers 17 and 22. This linear portion is bounded on the left by the control grid voltage $e_{g1}$ to which the upper curve begins to bend and on the right by the voltage $e_{g2}$ to which the lower curve begins to bend.

Examination of Figure 2 shows that the voltage $e_{g3}$ to which the signal 60 is restored differs from the voltage $e_{g4}$ to which the signal 61 is restored. This is necessary in order to make the most economical use of the tubes 17 and 22 since by so doing it is possible to make signals 60 and 61 have a maximum amplitude and still occupy a minimum space on the curves in Figure 2. If the negative peaks of signal 60 were restored to the same voltage as the positive peaks of the signal 61, say $E_{cc}$, the total voltage between the negative tips of the signal 61 and the signal 60 would cover twice the distance along the grid voltage axis of Figure 2 and it would not be possible to change the position of the two signals along this axis within such limits without distorting one signal or the other.

Figure 3 shows a face of a cathode-ray oscillograph tube 53 having a television wave form signal thereon. The marks 70, 71, and 72 represent the white level, blanking level, and synchronizing peak voltage level, respectively. These marks are usually engraved on a screen placed in front of the cathode-ray tube 53 and it is desirable, in checking the operation of the television signal source 11, to position the pattern so that corresponding parts of the television signal lie along side the marks 70, 71, and 72. In this way any discrepancy in the television signal may be easily observed.

Although I have illustrated this invention by means of a single example, it will be apparent to those skilled in the art that modifications may be made without departing from the spirit of the invention as illustrated by the following claims.

What I claim is:

1. An amplifier circuit comprising a first and second amplifier tube, each of said tubes having a cathode, anode, and an input electrode, connections to the input electrodes of said tubes to apply thereto oppositely oriented voltage signals; and first and second direct current restoration circuits connected between said signal applying connections, the said restoration circuits comprising a voltage supply, a potentiometer having its movable contact connected to one terminal of said voltage supply; said first restoration circuit comprising a first diode having its cathode connected to the input electrode of said first amplifier tube and its plate connected to one end of said potentiometer, and a resistance capacitance circuit connecting said plate to a second terminal of said voltage supply, said second direct current restoration circuit comprising a diode having its plate connected to the input electrode of said second amplifier and its cathode connected to the other end of said potentiometer, and a resistance capacitance circuit connecting said last-named cathode to said second terminal of said voltage supply.

2. The circuit as defined in claim 1 wherein the output electrodes of said first and second amplifier tubes are connected to deflection plates of a cathode ray tube.

3. A cathode ray tube amplifier circuit for the application of signals to the deflection plates in the cathode ray tube comprising in combination, a cathode ray tube having deflection means therein, first and second amplifier tubes having an anode, cathode and an input electrode, the anode of each of said tubes being connected to the deflection means of the cathode ray tube, the cathode of each of said tubes being connected to ground through a resistor, and the signal applying and direct current restoring circuits connected to the input electrodes of each of said tubes, the signal applying circuit of said first amplifier tube, being a coupling condenser connected to preliminary amplification and a signal source for the cathode ray tube, the direct current restorer circuit for said first amplifier comprising a source of voltage connected to a potentiometer, said potentiometer being connected between the signal applying electrodes of the said first and second amplifier tubes, a first diode having its cathode connected to the signal applying electrode of said first amplifier tube and its plate connected to the first side of the said potentiometer, said plate being brought to ground through a resistance capacitance circuit, the signal applying circuit of said second amplifier tube being a coupling condenser connected to said preliminary amplification and a signal source for the cathode ray tube, the direct current restorer for said second amplifier tube comprising a second diode having its plate connected to the signal applying electrode of said second amplifier tube and its cathode connected to the second side of said potentiometer and to ground through a resistance capacitance circuit.

RICHARD B. SANGER.

REFERENCES CITED

The following references are of record in the file of this patent:

UNITED STATES PATENTS

| Number | Name | Date |
|---|---|---|
| 2,153,638 | Norman | Apr. 11, 1939 |
| 2,258,752 | Fewings et al. | Oct. 14, 1941 |
| 2,447,507 | Kenyon | Aug. 24, 1948 |
| 2,466,712 | Kenyon | Apr. 12, 1949 |
| 2,471,246 | Smith | May 24, 1949 |
| 2,552,588 | Reeves | May 15, 1951 |